United States Patent [19]

Brajal et al.

[11] Patent Number: 5,796,814
[45] Date of Patent: Aug. 18, 1998

[54] DIGITAL TRANSMISSION SYSTEM COMPRISING A RECEIVER WITH CASCADED EQUALIZERS

[75] Inventors: Américo Brajal, Villeneuve-Le-Roi; Antoine Chouly, Paris, both of France

[73] Assignee: U.S. Philips Corporation, New York, N.Y.

[21] Appl. No.: 618,933

[22] Filed: Mar. 20, 1996

[30] Foreign Application Priority Data

Mar. 22, 1995 [FR] France .................. 95 03350

[51] Int. Cl.⁶ .................. H03H 7/30
[52] U.S. Cl. .................. 375/232; 375/229; 364/724.2
[58] Field of Search .................. 375/232, 231, 375/230, 229, 348, 346, 350; 329/318, 341, 315; 364/724.19, 724.2, 725, 726

[56] References Cited

U.S. PATENT DOCUMENTS

| | | | |
|---|---|---|---|
| 3,614,673 | 10/1971 | Kang et al. | 333/18 |
| 3,864,632 | 2/1975 | Chang | 375/230 |
| 4,972,433 | 11/1990 | Yamaguchi et al. | 375/230 |
| 5,199,047 | 3/1993 | Koch | 375/231 |
| 5,285,474 | 2/1994 | Chow et al. | 375/13 |
| 5,416,767 | 5/1995 | Koppelaar et al. | 375/260 |
| 5,636,244 | 6/1997 | Goodson et al. | 375/231 |

OTHER PUBLICATIONS

"Orthogonal Multicarrier Techniques Applied to Direct Sequence Spread Spectrum CDMA Systems", Antoine Chouly, Americo Brajal and Sabine Jourdan, Proceedings of IEEE Global Telecommunications Conference 1993, New York, US pp. 1723–1728, XP0000436106.

"Equalizer Training Algorithms for Multicarrier Modulation Systems", Proceedings of the International Conference on Communication, May 23, 1993, New York, pp. 761–765, XP000458238, Chow et al.

Primary Examiner—Stephen Chin
Assistant Examiner—Betsy L. Deppe
Attorney, Agent, or Firm—Robert J. Kraus

[57] ABSTRACT

A digital transmission system comprising a receiver with cascaded equalizers. The transmission system may also include multicarrier modulation means and multicarrier demodulation means comprising a semi-fixed equalizer cascaded with an adaptive equalizer. The semi-fixed equalizer equalizes the relatively stable or slowly and/or slightly changing imperfections which are due to the channel and the adaptive equalizer equalizes the imperfections which are due to transmission noise. The invention likewise relates to a process for determining the characteristics of the semi-fixed equalizer.

12 Claims, 5 Drawing Sheets

DIGITAL TRANSMISSION SYSTEM COMPRISING A RECEIVER WITH CASCADED EQUALIZERS

BACKGROUND OF THE INVENTION

1. Field of the Invention

The invention relates to a digital transmission system comprising a transmitter and at least a receiver which communicate with each other by a channel, the transmitter transmitting multicarrier signals, the receiver comprising equalizer means which include at least one equalizer and computing means for updating weight factors of the equalizer.

The invention likewise relates to a receiver used in such a system and an updating process for updating weight factors.

2. Description of the Related Art

The technique of transmission by multicarrier signals is known as being very effective for transmitting data on broadcast channels that use radio channels or point-to-point links by cable. The multicarrier technique has been established to be superior to the monocarrier technique as regards the equalization of received signals, more particularly, for channels that have a long impulse response. Indeed, one can replace a monocarrier device which uses a very complex equalizer in the time domain by a multicarrier device which uses an equalizer that has only a single weight factor working for each carrier in the frequency domain. Nevertheless, when the impulse response of the channel really becomes very long, this equalization technique of the multicarrier device turns out to be insufficient. Thus, an equalization in the time domain is to be considered.

Document U.S. Pat. No. 5,285,474 is known which describes a method of equalizing a multicarrier signal in a multicarrier transmission system. It may happen for a considerably distorted channel, that the impulse response of the channel is very long, which makes it necessary to use an equalizer that has a high number of factors. The object described in U.S. Pat. No. 5,285,474 to define an equivalent channel formed by the channel and the equalizer, which equivalent channel has a reduced impulse response, so as to confine the size of the equalizer to reduce the hardware means (as regards quantity and thus cost) necessary for performing the equalization. The process described in U.S. Pat. No. 5,285,474 determines the parameters of the equalizer by comparing samples of a received sequence with samples of a locally stored training sequence. The process determines, by successive approximations, both the reduced impulse response of the desired target channel and the impulse response of the equalizer which, cascaded with the real channel, forms a combination that approaches the target channel in the best possible way. The process determines therefore the transfer function of the target channel in the frequency domain, transforms this function into an impulse response in the time domain by applying an inverse Fourier transform, performs a windowing operation and derives weight factors which are loaded in the equalizer. In the same manner, the process adapts the impulse response of the target channel in accordance with the factors of the equalizer. Thus, the characteristics of the target channel and those of the equalizer are recurrently adapted to each other as a function of the convergence of said characteristics.

This technique may be used for obtaining a reduced impulse response, whatever the respective channel. This equalization process is very complex and needs multiple calculation steps for obtaining the factors that permit of the adaptive correction of imperfections which result from any channel that has a long impulse response. This calculation process works in a loop for determining simultaneously the characteristics of the equalizer and those of a target channel. The convergence of such a process lasts long, which process may furthermore be the subject of instabilities.

SUMMARY OF THE INVENTION

It is an object of the invention to simplify the equalization technique that acts on multicarrier signals, even in the case of long impulse response, by taking account of specific features of the channel without confining the process to a given target channel.

This object is achieved by a semi-fixed equalizer for which the computing means estimate an inverse transfer function to a transfer function that characterizes the channel, while the computing means determine via the inverse transfer function the weight factors for intermittently updating the semi-fixed equalizer.

The semi-fixed equalizer is provided for correcting the relatively stable or slowly and/or slightly evolutionary imperfections of the channel. Such a channel is found, for example, on cables, telephone lines, for example, twisted-pair telephone lines. Also radio channels may be involved. Generally, such channels exist for digital transmissions between fixed points.

To follow the evolutions of the channel, which evolutions cannot be taken into account by the semi-fixed equalizer, and to adapt itself to the channel noise, an adaptive equalizer equalizing the transmission imperfections created by superimposed noise is added to the equalization means downstream of the semi-fixed equalizer. Thus, the equalization performed to compensate for the imperfection due to the channel is dissociated from the equalization performed to compensate for the imperfection due to the superimposed noise. The characteristics of the two equalizers are thus determined independently of each other.

The length of the impulse response of the semi-fixed equalizer may be restricted to confine the equalizer complexity. To ensure the equalization for a given duration, the computing means select the weight factors by performing a windowing function of the inverse transfer function, to contain temporarily equalization faults for a given reduced duration. The windowing may furthermore put a smoothing operation of the impulse response into effect.

For permitting the receiver to determine the inverse transfer function of the channel, the transmitter transmits sequences which may be initialization sequences or test sequences. In this way the computing means store replicas of initialization and/or test sequences of known structure, which have been transmitted beforehand by the transmitter, and estimate the channel transfer function by comparing received sequences with the stored replicas.

An initialization sequence is a sequence transmitted at the start of a transmission on connection of the transmitter to the receiver. It makes it possible for the receiver to be synchronized with the transmitter and to determine the characteristics of the channel.

A test sequence is a sequence which is intermittently transmitted by the transmitter. Indeed, this may relate to, for example, a transmitter operating with various receivers. When a still unconnected receiver starts communicating with the transmitter, which may happen at any moment, the transmitter is to transmit intermittently, preferably periodically, one or various test sequences which make it possible for the receiver to be synchronized with the transmitter and to determine the characteristics of the channel.

Preferably, the sequences are transmitted in a format called Orthogonal Frequency-Division Multiplex format which comprises a guard interval, while the guard interval has the given reduced duration.

The invention likewise relates to a process used in a digital transmission system comprising a transmitter and at least a receiver which communicate with each other by a channel, the transmitter transmitting multicarrier signals, the receiver comprising equalizer means which include at least one equalizer and computing means for updating weight factors of the equalizer, characterized in that the process comprises the following steps:

initializing the equalizer, so that it transfers, without modifying, a received signal which comprises sequences, estimating the channel transfer function by comparing a received sequence with a locally known replica of said sequence, calculating the inverse transfer function, calculating the inverse Fourier transform of the inverse transfer function to obtain an inverse impulse response, selecting samples of the inverse impulse response and transferring them in the equalizer as weight factors.

These and other aspects of the invention will be apparent from and elucidated with reference to the embodiments described hereinafter.

DESCRIPTION OF THE PREFERRED EMBODIMENTS

The invention relates to a multicarrier transmission system for which the transmit messages are distributed over various carriers to reduce the risk of errors linked with imperfections, sometimes selective imperfections, of the transmission channels. By way of example, the description that follows relates to the case of a modulation called Orthogonal Frequency-Division Multiplexing (OFDM). To simplify the notation, the initials OFDM will be used in the following of the description. Other types of multicarrier transmission may also be used.

Figure 1A:
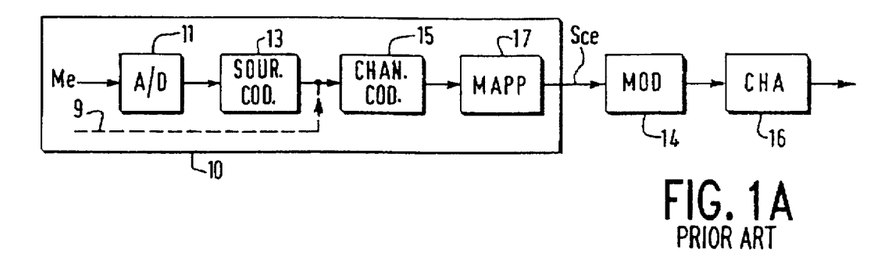
FIGS. 1A and 1B show a diagram of a digital transmission system known in the art.
Figure 1B:
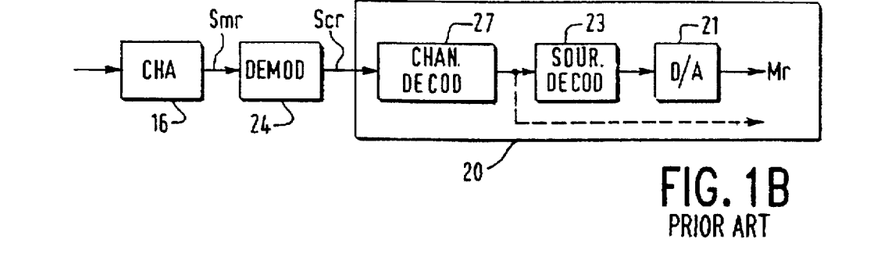

A conventional digital transmission system is shown in FIGS. 1A and 1B. The transmitter comprises in a series combination (FIG. 1A):

coding means 10, for coding the transmit messages Me and for transforming them into symbols Sce of a constellation, and modulation means 14, which modulate carriers by the digital baseband data which represent the symbols. The symbols are then transmitted by the channel CHA16 according to the known techniques.

The coding means 10 for coding the message Me may comprise in a series combination:

analog/digital converter means 11 A/D, which may be followed by a source coder 13 SOUR. COD., a channel coder 15 CHAN COD., and a mapping unit 17 MAPP, of the binary data in one or various constellations depending on the respective carrier.

This may relate to QAM, QPSK, BPSK or other constellations. The source coder 13 and channel coder 15 can be omitted depending on the characteristics of the communication channel. Similarly, the A/D converter 11 and the source coder 13 can be omitted if the message Me is available in digitized form (connection 9). In contrast, the converter exists, for example, in the case of voice messages for telephone communications.

The receiver comprises (FIG. 1B):

demodulation means 24, for extracting the digital baseband data which represent the received coded symbols Scr, decoding means 20, for decoding received messages Mr on the basis of received coded symbols Scr by performing the reverse operations to those performed on transmission by the coding means 10.

The decoding means 20 comprise in a series combination channel decoding means 27 CHAN DECOD, source decoding means 23 SOUR. DECOD and digital/analog converter means 21 D/A. These means exist in so far as the reverse codings have previously been effected on transmission.

The invention relates to demodulation means 24 for recovering with a low error rate the symbols transmitted by the transmitter.

Generally, the transmission system can be formed by a transceiver station which communicates with one or various transceiver stations. A transceiver station then comprises a transmitter and a receiver as described above.

Figure 2:
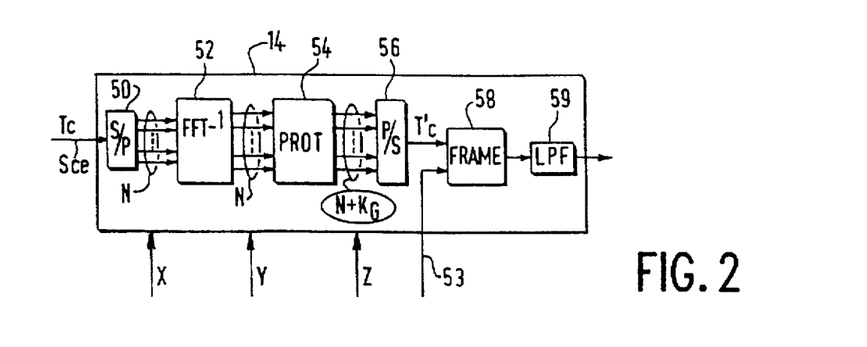
FIG. 2 shows a diagram of an Orthogonal Frequency Division Multiplex modulator intended to effect a multicarrier transmission.

FIG. 2 is an example of a basic circuit diagram of part of the modulation means 14 which comprises an OFDM modulator. The digital data representing the coded transmit symbols Sce, generated at the rate 1/Tc (a block lasts NTc seconds), are deserialized in a block 50. The deserialized data enter a calculation unit 52 for the calculation of an inverse Fourier transform $FFT^{-1}$ of the $N^{th}$ order which produces N parallel output signals.

At a given instant the N parallel output signals form a part of an OFDM data block. A device 54 adds data that correspond to a guard interval to this part of the data block. This addition consists of copying certain data again. This guard interval may not exist in certain applications.

Figure 4:
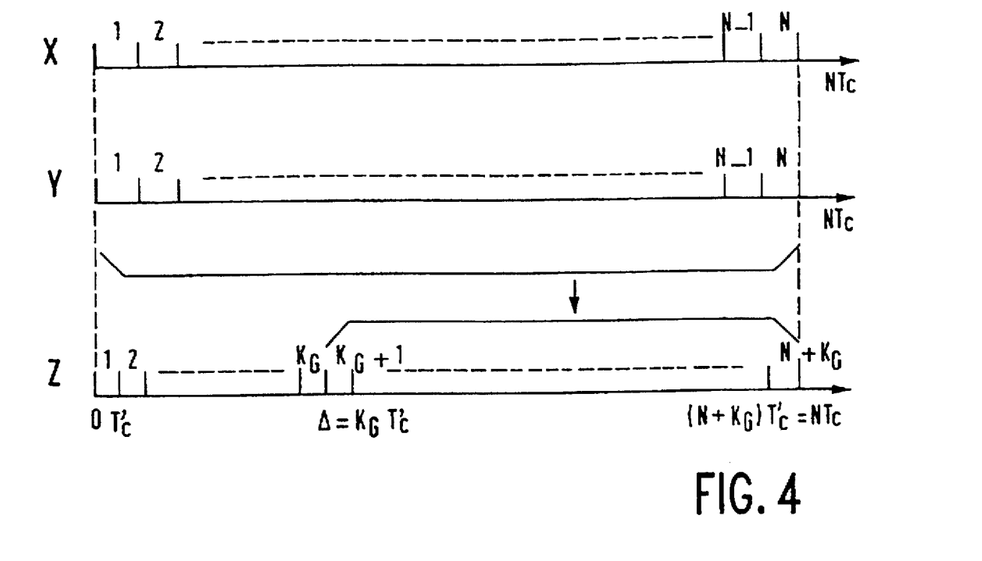
FIG. 4 shows a timing diagram of symbols plotted against a period of time NTc.

FIG. 4 shows in detail the mechanisms used in the construction of an OFDM data block. A symbol Sce is generally a complex value. Block 50 (FIG. 2) performs a deserialization and produces in parallel the N symbols (referenced as X) which enter block 52 which performs an $N^{th}$-order inverse Fourier transform, where $N=2^j$, where j is an integer. The N symbols leaving block 52 (referenced as Y) at the rate 1/T'c are in their turn added by $K_G$ symbols, which corresponds to a guard interval $\Delta=K_G \cdot T'c$ which forms protection, so that the total duration of the block $(N+K_G)T'c$ remains equal to NTc. The $K_G$ symbols correspond to a copy of the last symbols of the preceding N symbols. The $K_G$ symbols are put before the N symbols to form a data block of $(K_G+N)$ transmit symbols (referenced as Z). A serializer 56 performs a serialization of the $(K_G+N)$ symbols produced at the rate 1/T'c. The successive blocks of $(K_G+N)$ OFDM symbols are then organized in an OFDM frame in a device 58 FRAME. This device adds special symbols 53 (synchronization, wobulation or others) which are used, for example, for synchronizing transmission and reception or for estimating the channel. A low-pass filter 59 LPF filters the signals before they are transmitted via the multicarrier modulator of the modulation means 14.

Figure 3:
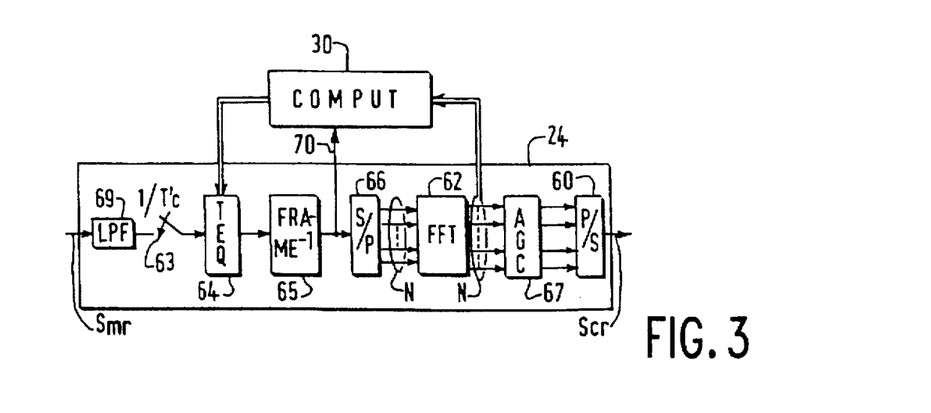
FIG. 3 shows a diagram of an Orthogonal Frequency Division Multiplex demodulator.

On reception, the received modulated symbols Smr are demodulated in the demodulation means 24 (FIG. 1) which perform a reverse process to that performed on transmission. The means 24 comprise in a series combination (FIG. 3)

a low-pass filter 69, a sampler 63, having a rate 1/T'c, equalizer means TEQ 64, operating in the time domain, a device FRAME$^{-1}$ 65, for deframing the data, a deserializer 66, which produces N useful symbols and which thus discards the $K_G$ symbols received during the guard interval, a calculating device 62, for calculating a direct Fourier transform which produces a block sequence of N symbols, an equalizing device AGC 67, in the frequency domain which effects a complex gain control of each subcarrier, a serializer 60, which acts on the N symbols and produces the received coded symbols Scr. These symbols Scr enter the decoding means 20 (FIG. 1B).

Figure 8:
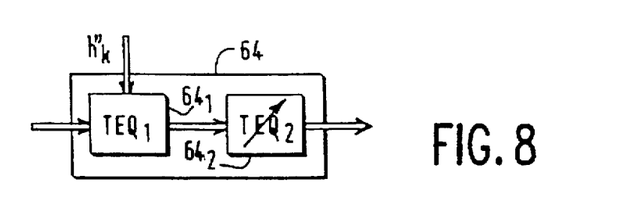
FIG. 8 shows a diagram of the cascaded combination of a semi-fixed equalizer adapted to the channel and of an adaptive equalizer which adapts itself to the noise.

According to the invention, the equalizing means 64 of the receiver thus comprise a semi-fixed equalizer $64_1$ for correcting the imperfections caused by the channel, and an adaptive equalizer $64_2$ for correcting the imperfections caused by the noise (FIG. 8). For determining the characteristics of the semi-fixed equalizer, the receiver comprises computing means COMPUT 30 intended, among other things, for computing and updating the weight factors of the semi-fixed equalizer, so that its transfer function is substantially the reverse to the transfer function of the channel.

For certain transmission systems, this updating may be effected on initialization, the moment the receiver is connected to the transmitter. For other transmission systems, a transmitter can communicate with various receivers. In that case, the receiver does not immediately receive an initialization sequence when it is connected, but it has to wait for test sequences intermittently transmitted by the transmitter.

The characteristics of the semi-fixed equalizer $64_1$, which operates in the time domain, are determined for reversing the channel characteristics. Thus, the serialization of the real channel and of the semi-fixed equalizer narrows down to an equivalent channel that has unit response. The real channel may develop in the course of time. For example, the number of peripherals connected to the same telephone line, or also the meteorologic conditions in the case of a radio reception, may develop in the course of time. Therefore, the channel transfer function is affected. Thus, intermittently, preferably periodically, the channel characteristics are to be recomputed to derive therefrom the characteristics of the semi-fixed equalizer.

Figure 5:
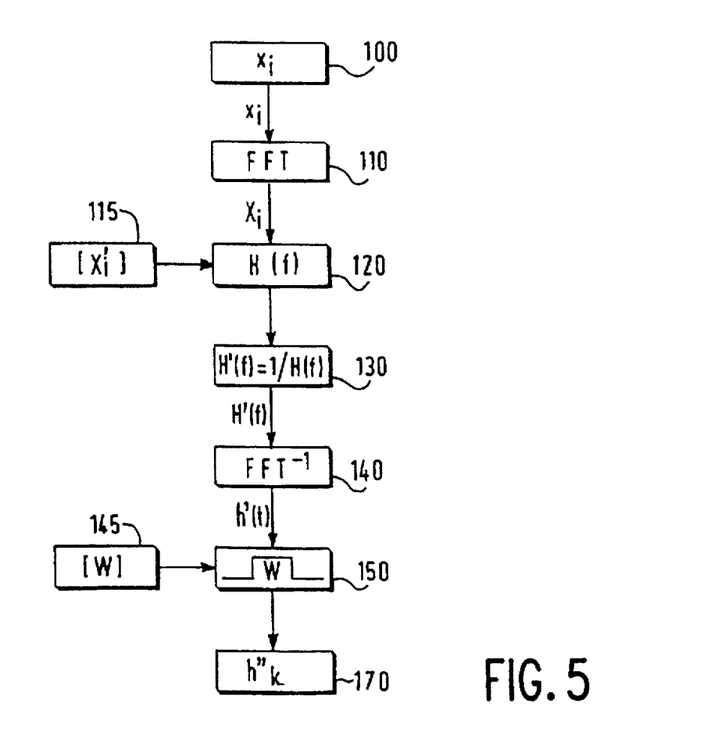
FIG. 5 shows a flow chart of steps of the process for the calculation of the weight factors.

This updating is effected in accordance with the diagram of FIG. 5. For clarity, the time domain will be designated in the following in lower-case letters and the frequency domain in upper-case letters. During the connection of the receiver, the weight factors of the semi-fixed equalizer are not correct a priori. Therefore, at the beginning of the process, the system commences by neutralizing the semi-fixed equalizer while rendering it transparent to input data, that is to say, it transmits the received signal without a change. The process of computing the factors is carried out with known sequences, that is, initialization sequence or test sequence. At the input of the receiver they provide received sequences $x_i$. These sequences (block 100) arrive at a Fourier transform device (block 110) without being altered by the equalizer. The sequences $x_i$ of the time domain are then transformed into data $X_i$ in the frequency domain. Replicas $X'_i$ of the sequences, either initialization sequence or test sequence, are stored in the receiver (block 115). By comparing (block 120) the received sequence $X_i$ and the corresponding replica $X'_i$ stored in the receiver, the test means determine the transfer function H(f) of the channel. This transfer function is determined for a discrete number of frequencies, preferably, for the frequencies of the carriers used. The transfer function H(f) is inverted (block 130) to provide an inverse transfer function H'(f), so that $$H'(f)=1/H(f).$$

The inverse transfer function H'(f) is transformed to the time domain by performing an inverse Fourier transform (block 140) to produce an inverse impulse response h'(t). The latter is then truncated to reduce its length. Therefore, the computing means store (block 145) a window W, which defines the length one wishes to give to the impulse response h'(t). The truncating is effected by a multiplication (block 150) combined with a maximization of the energy that relates to the part of the impulse response situated in the window W. One may wish, for example, to limit the impulse response to 128 samples. A window W of 128 samples is then taken, the energy of the part of the response situated in the window is computed and the window W to scan the whole impulse response h'(t) is moved to and fro. The part of the impulse response that contains the maximum energy is thus determined. The samples $h''_k$ (block 170) forming the impulse response (discrete domain) are thus selected for being loaded in the semi-fixed equalizer.

This process is carried out on connection of the receiver to the transmitter. It may also be carried out during the connection to take account of the developments of the transmission channel.

The window W may have steep or smooth edges. Thus, the window does not only affect the number, but also the amplitudes of the weight factors. Thus it is possible to improve the transfer function of the equalizer by letting the selected part of the impulse response (maximum energy) undergo the action of a window which has smooth edges to perform a smoothing operation.

Figure 6A:
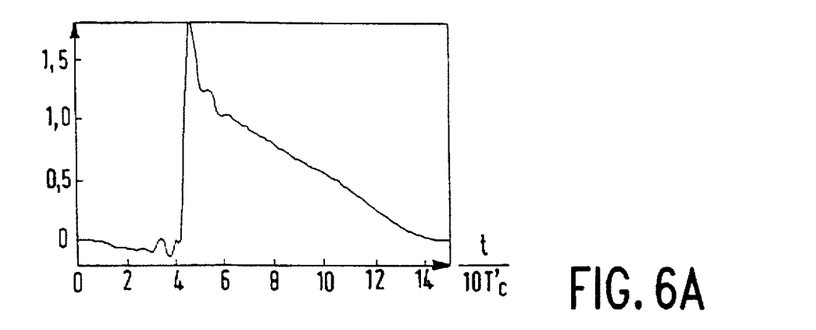
FIGS. 6A to 6F show six curves showing variations of impulse responses for various steps in the running of the process.
Figure 6B:
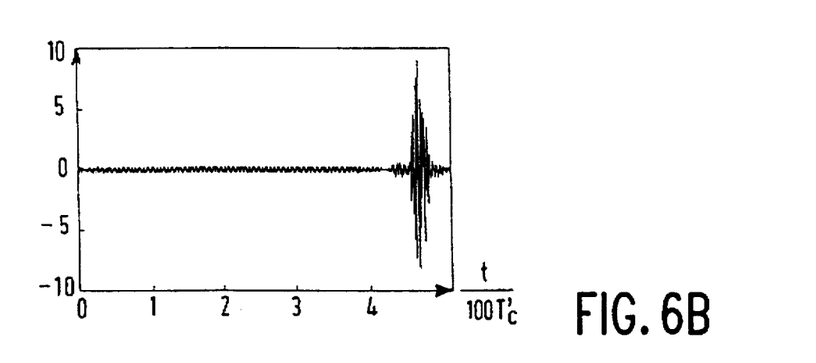
Figure 6C:
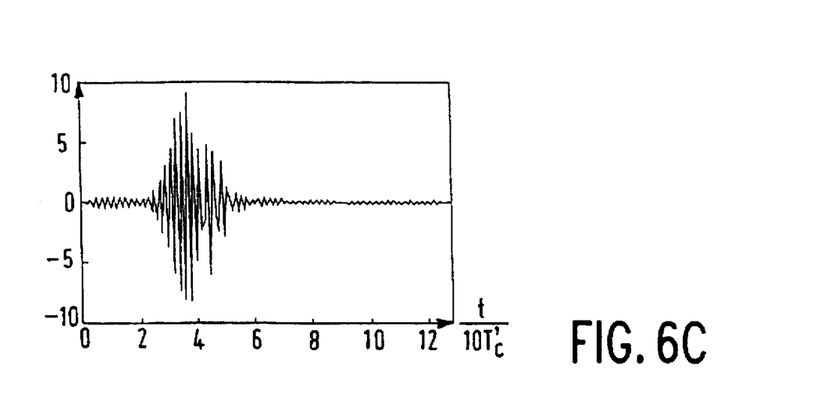
Figure 6D:
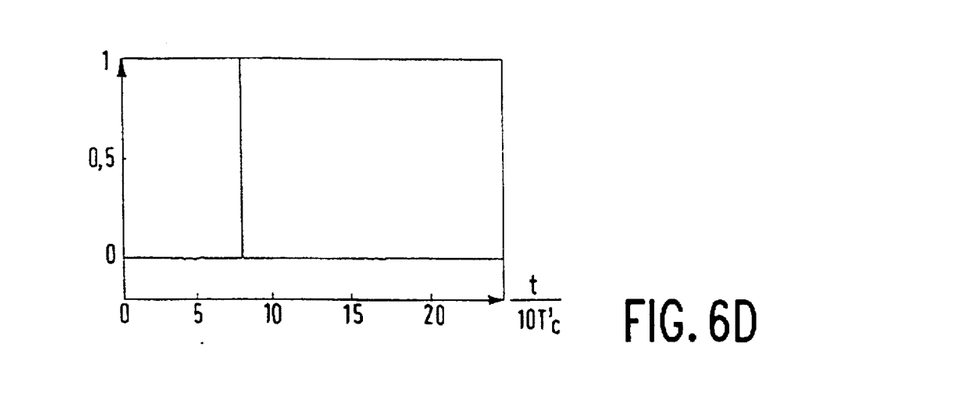
Figure 6E:
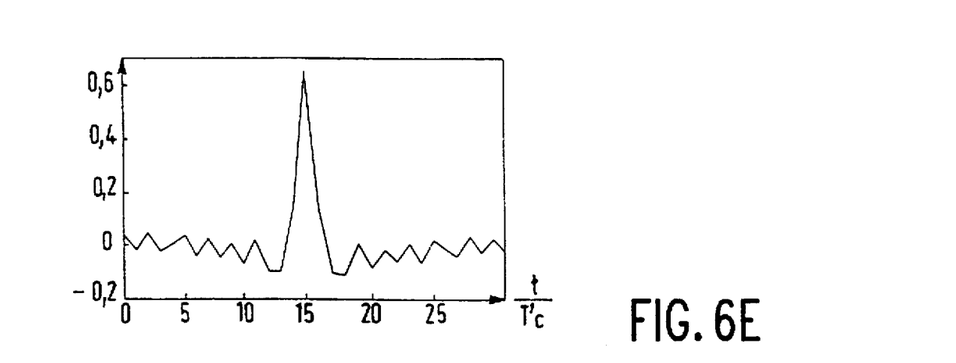
Figure 6F:
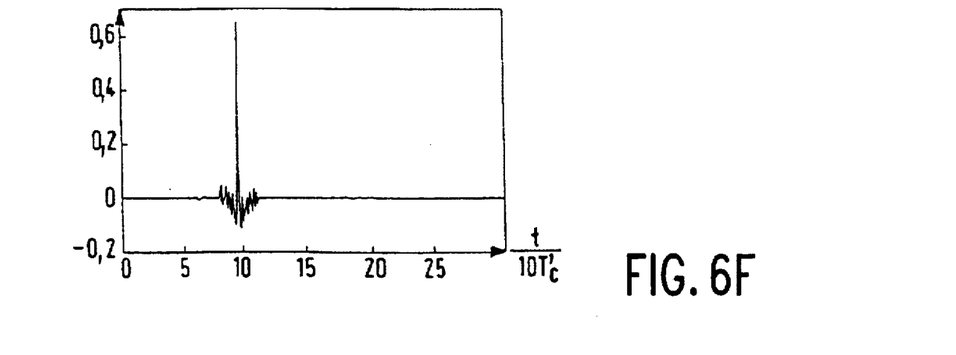

By way of example, the FIGS. 6A to 6F show curves obtained at different steps of the process. FIG. 6a shows an example of channel impulse response h(t) which goes on for a long period of time. FIG. 6B shows the inverse channel impulse response h'(t) obtained at the output of the inverse Fourier transform. FIG. 6C corresponds to FIG. 6B after the windowing operation combined with a time shift. FIG. 6D corresponds to the convolution product h'(t)*h(t) of the impulse response h(t) of FIG. 6A by the inverse impulse response h'(t) of FIG. 6C. FIG. 6D thus represents the response to a Dirac pulse of the channel serialized by the semi-fixed equalizer. There may be observed that there is a high peak with minor undulations on either side which reveal slight equalization irregularities. These imperfections are considered noise and are therefore picked up by the adaptive equalizer. By using an adaptive equalizer which has the impulse response of FIG. 6E, the convolution of the signal shown in FIG. 6D, with the impulse response of FIG. 6E, leads to the signal shown in FIG. 6F. There may be observed that the irregularities away from the central peak are reduced, which indicates an improvement of the equalization in this area. In contrast, other imperfections appear at the base of the peak, but they are temporarily situated in a part of the signal that is included in the guard interval in the case of the OFDM technique and are therefore not annoying.

For utilizing the described process, it is necessary to perform first a direct Fourier transform and then an inverse Fourier transform. In a multicarrier transmission system (FIG. 3), FFT means for performing a direct Fourier transform are necessary for processing the received signals. Therefore, it is preferred not to duplicate the means that perform the Fourier transform and utilize the FFT means which the receiver contains. The input of the computing means 30 is thus connected to the output of the already existing FFT means.

Figure 7:
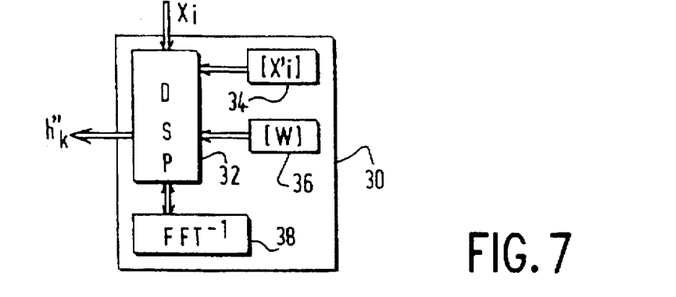
FIG. 7 shows a diagram of an embodiment of computing means for updating the weight factors of the equalizer.

FIG. 7 shows a diagram of the computing means 30 which make it possible to carry out the steps described with respect to FIG. 5. The computing means 30 comprise:

means 34, for storing a replica $X'_i$ of the initialization sequence or test sequence (or various replicas of various sequences), means 36, for storing the parameters of the window W, means 38, for performing an inverse Fourier transform $FFT^{-1}$.

computing sub-means 32, for receiving the sequences $X_i$ received by the receiver, for producing the updated weight factors h"k, for performing the comparison of $X_i$ with $X'_i$, for performing the inverting operations of H(f) to 1/H(f), and for performing the multiplication operations h'(t) via the window W.

The computing sub-means 32 are, for example, formed by a calculator or a digital signal processor DSP.

When the updated weight factors have been transferred in the semi-fixed equalizer, the latter thus has a reverse transfer function to that of the channel. The equalizer thus corrects the imperfections due to the channel itself, while the channel develops only slowly at the rate of the network modifications as a result of the appearance or disappearance of connection taps. The transmission imperfections caused by the channel are thus compensated for. Nevertheless, in real conditions of use, other imperfections of a dynamic nature are created by superimposed noise. To correct these imperfections, which develop too rapidly to be taken into account by the semi-fixed equalizer, an adaptive equalizer of the conventional type, which operates according to known equalization algorithms, is connected in series with the semi-fixed equalizer.

Figure 9:
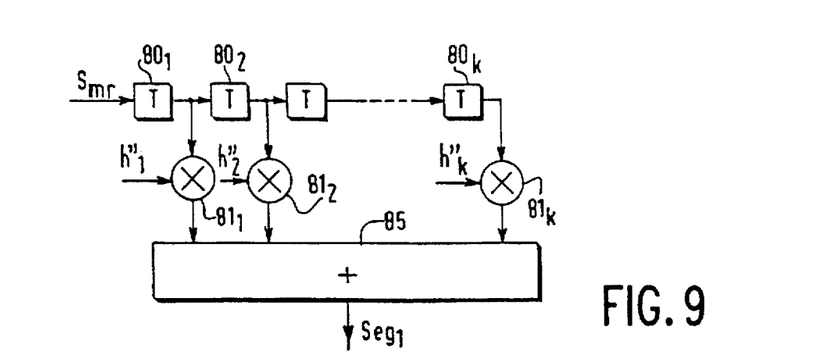
FIG. 9 shows a diagram of the semi-fixed equalizer.
Figure 10:
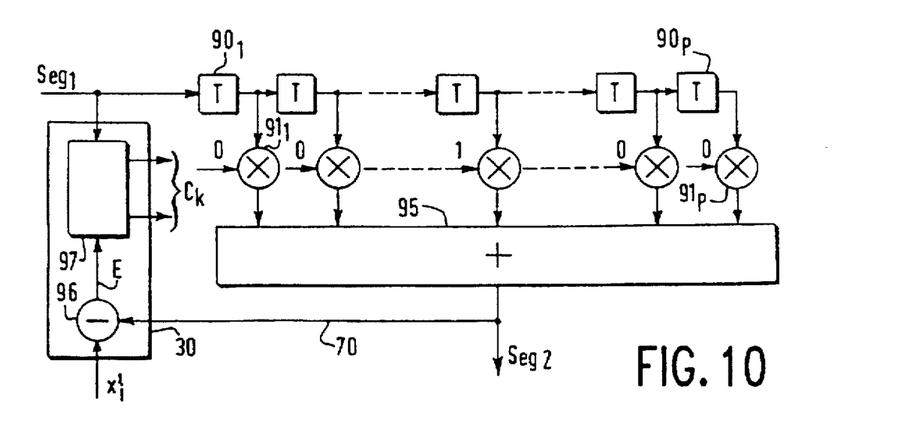
FIG. 10 shows a partial diagram of the adaptive equalizer.

FIG. 9 shows an illustrated embodiment of the semi-fixed equalizer. It comprises a plurality of shift cells $80_1$ to $80_k$ in which the sampled signal $S_{mr}$ to be equalized dwells. The output of each cell is connected to an input of a multiplier $81_1$ to $81_k$, which has another input connected to the selected weight factors h"$_1$ to h"$_k$. The outputs of the multipliers are connected to a summator 85 which produces an equalized signal $S_{eg1}$. The weight factors are updated intermittently according to the process described earlier. The equalized signal $S_{eg1}$ then enters the adaptive equalizer of a conventional type of which an example is shown in FIG. 10. It comprises various shift cells $90_1$ to $90_p$ in which the signal $S_{eg1}$ to be equalized dwells. The output of each cell is connected to an input of a multiplier $91_1$ to $91_p$, which has another input connected to weight factors $C_k$. The outputs of the multipliers are connected to a summator 95 which produces an equalized signal $S_{eg2}$. For computing the weight factors of the adaptive equalizer, the computing means COMPT 30 comprise comparing means 96 and computing sub-means 97. The comparing means 96 compare the reference sequence $x'_i$ with the corresponding sequences in the signal $S_{eg2}$ (connection line 70). The result of the comparison is an error signal E which enters the computing sub-means 97 which applies a calculation algorithm of the weight factors $C_k$ of the adaptive equalizer by also taking the signal $S_{eg1}$ into account. This algorithm may be the gradient algorithm minimizing the mean square error. The factors thus determined are updated adaptively. For initializing the adaptive equalizer at the beginning of its operation, preferably a certain value, for example, a value "1" is given to the central factor, and a value "0" is given to the other factors. The adaptive equalizer thus has a symmetric structure which enables it to converge more rapidly. Any other distribution of the factors is also suitable.

What is claimed is:

1. A digital transmission system comprising a transmitter and at least a receiver which communicate with each other by a channel, the transmitter transmitting multicarrier signals, the receiver comprising equalizer means which include at least one equalizer and computing means for intermittently updating weight factors of the equalizer, characterized in that the equalizer is a semi-fixed equalizer for which the computing means estimate an inverse transfer function to a transfer function that characterizes the channel, while the computing means determine from the inverse transfer function updating weight factors for intermittently updating the semi-fixed equalizer, the updating weight factors being obtained by calculating an inverse Fourier transform of the inverse transfer function, operating a windowing operation consisting of multiplying the calculated inverse Fourier transform by a sliding window to obtain several sets of possible weight factors, and then selecting one set from said several sets of possible weight factors as the updating weight factors, the one set being the set of possible weight factors having a maximal energy.

2. The system as claimed in claim 1, wherein the equalizer means comprise, downstream of the semi-fixed equalizer, an adaptive equalizer for equalizing transmission imperfections created by superimposed noise.

3. The system as claimed in claim 1, wherein the computing means select the weight factors by performing a windowing operation of the inverse transfer function for temporarily keeping equalization faults in check for a given reduced duration.

4. The system as claimed in claim 3, wherein the computing means store replicas of at least one of initialization and test sequences of known structure, which have been transmitted beforehand by the transmitter, and estimate the transfer function of said channel by comparing received sequences with the stored replicas.

5. The system as claimed in claim 4, wherein the sequences are transmitted in a format called orthogonal frequency-division multiplex format which comprises a guard interval, while the reduced duration is that of the guard interval.

6. A receiver which receives multicarrier digital signals transmitted by a channel, the receiver comprising equalizer means which include at least one equalizer and computing means for updating weight factors of the equalizer, wherein the equalizer is a semi-fixed equalizer for which the computing means estimate an inverse transfer function to a transfer function that characterizes the channel, while the computing means determine via the inverse transfer function the weight factors for intermittently updating the semi-fixed equalizer.

7. The receiver as claimed in claim 6, wherein the equalization means comprise, downstream of the semi-fixed equalizer, an adaptive equalizer for equalizing transmission imperfections created by superimposed noise.

8. The receiver as claimed in claim 6, wherein the computing means select the weight factors by performing a windowing operation of the inverse transfer function for temporarily keeping equalization faults in check for a given reduced duration.

9. The receiver as claimed in claim 8, wherein the computing means store replicas of at least one of initialization and test sequences of known structure, which have been transmitted beforehand by the transmitter, and estimate the channel transfer function by comparing received sequences with the stored replicas.

10. The receiver as claimed in claim 9, wherein the sequences are transmitted in a format called orthogonal frequency-division multiplex format which comprises a guard interval, while the reduced duration is that of the guard interval.

11. A process used in a digital transmission system comprising a transmitter and at least a receiver which communicate with each other by a channel, the transmitter transmitting multicarrier signals, the receiver comprising equalizer means which include at least one equalizer and computing means which intermittently updates weight factors of the equalizer, wherein the process comprises the following steps:

initializing the equalizer, so that it transfers, without modifying, a received signal which comprises sequences, estimating the transfer function of said channel by comparing a received sequence with a locally known replica of said sequence, calculating an inverse transfer function of said estimated transfer function, calculating an inverse Fourier transform of the calculated inverse transfer function to obtain inverse impulse response samples, and selecting a set of the inverse impulse response samples and transferring the selected set to the equalizer as weight factors, the selected set being a set of inverse impulse response samples having a maximal energy.

12. The process as claimed in claim 11, wherein the selecting step is done by performing a windowing operation and includes the step of calculating a maximum value of energy of the samples contained in a window that moves to and fro, while the window affects at least one of the number and amplitudes of the weight factors.

* * * * *